(12) United States Patent
Ishikawa et al.

(10) Patent No.: US 6,251,038 B1
(45) Date of Patent: Jun. 26, 2001

(54) CONTINUOUSLY VARIABLE TRANSMISSION UNIT

(75) Inventors: Kouji Ishikawa, Fujisawa; Takashi Imanishi, Yokohama, both of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/420,283

(22) Filed: Oct. 18, 1999

(30) Foreign Application Priority Data

Oct. 21, 1998 (JP) .................................................. 10-299498

(51) Int. Cl.[7] .................................................. F16H 37/02
(52) U.S. Cl. .................................................. 475/216
(58) Field of Search .................................. 475/215, 216, 475/278

(56) References Cited

U.S. PATENT DOCUMENTS

| | | | | |
|---|---|---|---|---|
| 4,382,188 | * | 5/1983 | Cronin | 475/216 X |
| 5,074,830 | * | 12/1991 | Perry | 475/216 |
| 5,213,011 | * | 5/1993 | Nobumoto et al. | 475/216 X |
| 5,564,998 | * | 10/1996 | Fellows | 475/216 |
| 5,683,324 | * | 11/1997 | Inoue et al. | 475/216 |
| 5,720,687 | * | 2/1998 | Bennett | 475/216 X |
| 5,888,160 | * | 3/1999 | Miyata et al. | 475/216 |
| 5,967,931 | * | 10/1999 | Hoge et al. | 475/216 |
| 6,063,002 | * | 5/2000 | Nobumoto et al. | 477/41 |
| 6,117,037 | * | 9/2000 | Yamazaki | 475/216 |

* cited by examiner

*Primary Examiner*—Charles A Marmor
*Assistant Examiner*—Roger Pang
(74) *Attorney, Agent, or Firm*—Christensen O'Connor Johnson Kindness PLLC

(57) ABSTRACT

A continuously variable transmission unit, which combines a toroidal-type continuously variable transmission of the double-cavity type and an epicyclic train, comprises a low-speed clutch and a high-speed clutch. In a low-speed drive mode, the low-speed clutch is connected to allow all torque to be transmitted to an output shaft through the toroidal-type continuously variable transmission. In a high-speed drive mode, the high-speed clutch is connected to allow most of torque to be transmitted to the output shaft through an epicyclic train and some of the torque to be applied to output discs of the toroidal-type transmission. The combination of the transmission and the epicyclic train serve to improve the transfer efficiency and durability of the continuously variable transmission unit.

2 Claims, 11 Drawing Sheets

CONTINUOUSLY VARIABLE TRANSMISSION UNIT

BACKGROUND OF THE INVENTION

The present invention relates to a continuously variable transmission unit incorporating a toroidal-type continuously variable transmission that is utilized for a power transmission system of an automobile, for example, and more particularly, to a continuously variable transmission unit reduced in size and improved to secure the durability of the toroidal-type continuously variable transmission.

A study is made of use of a toroidal-type continuously variable transmission schematically shown in FIGS. 4 and 5 as an automotive transmission. In this continuously variable transmission, an input disc 2 is supported coaxially on an input shaft 1. An output disc 4 is fixed to an end portion of an output shaft 3 that is coaxial with the input shaft 1. Pivots 5 and trunnions 6 are arranged in a casing (not shown) that contains the transmission therein. The pivots 5 are situated in torsional positions with respect to the input and output shafts 1 and 3. The trunnions 6 are rockable around their corresponding pivots 5.

Each pivot 5 is attached to each side face of each corresponding trunnion 6 in a coaxial manner. A displacement shaft 7 is provided in the center of each trunnion 6. When each trunnion 6 rocks around its corresponding pivot 5, the angle of inclination of its corresponding displacement shaft 7 changes. The displacement shaft 7 on each trunnion 6 supports a power roller 8. The roller 8 can rotate around the shaft 7. Each power roller 8 is interposed between opposite inner side faces 2a and 4a of the input and output discs 2 and 4. The inner side faces 2a and 4a are concave surfaces that can be obtained if an arc of a circle around each pivot 5 is rotated around the shafts 1 and 3. An outer peripheral surface 8a of each power roller 8 is a spherical convex surface that mates with the concave surfaces. The outer peripheral surface 8a is in contact with the inner side faces 2a and 4a of the discs 2 and 4.

A loading cam device 9 for use as pressure means is interposed between the input shaft 1 and the input disc 2. The cam device 9 elastically presses the input disc 2 toward the output disc 4. The rotation of the input shaft 1 is transmitted to the input disc 2 via the device 9. The loading cam device 9 includes a loading cam (cam plate) 10, which can rotate integrally with the input shaft 1, and a plurality of rollers 12 (e.g., four in number) that are held for rolling motion by means of a ring-shaped retainer 11. A cam face 13 that undulates in the circumferential direction is formed on one surface (right-hand surface in FIG. 4) of the loading cam 10. A cam face 14, which resembles the cam face 13 in shape, is formed on the outer side face (left-hand surface in FIG. 4) of the input disc 2. The rollers 12 are rotatably supported by shafts that extend radially from the center of the input shaft 1.

In the toroidal-type continuously variable transmission constructed in this manner, the loading cam 10 rotates as the input shaft 1 rotates. When the cam 10 rotates, its cam face 13 presses the rollers 12 toward the cam face 14 of the input disc 2. In consequence, the input disc 2 is pressed against the power rollers 8, and at the same time, the cam faces 13 and 14 push each other with the rollers 12 between them, whereupon the input disc 2 rotates. As the input disc 2 rotates, the power rollers 8 rotate around their corresponding shafts 7. The rotation of each roller 8 is transmitted to the output disc 4. As the output disc 4 rotates, the output shaft 3 that is fixed to the disc 4 rotates.

The following is a description of the way of changing the ratio (i.e., gear ratio) of the rotating speed of the output shaft 3 to that of the input shaft 1. In decelerating the rotation of the input shaft 1 and transmitting it to the output shaft 3, the trunnions 6 are tilted around their corresponding pivots 5, as shown in FIG. 4. Thus, each displacement shaft 7 is inclined so that the outer peripheral surface 8a of each power roller 8 is in contact with the central portion of the inner side face 2a of the input disc 2 and the outer peripheral portion of the inner side face 4a of the output disc 4. In accelerating the rotation of the input shaft 1 and transmitting it to the output shaft 3, in contrast with this, the trunnions 6 are tilted in the opposite direction around their corresponding pivots 5, as shown in FIG. 5. Thus, each displacement shaft 7 is inclined so that the outer peripheral surface 8a of each power roller 8 is in contact with the outer peripheral portion of the inner side face 2a of the input disc 2 and the central portion of the inner side face 4a of the output disc 4. If each displacement shaft 7 is inclined at an angle intermediate between the ones shown in FIGS. 4 and 5, an intermediate gear ratio can be obtained between the input and output shafts 1 and 3.

FIGS. 6 and 7 show a more specific example of the toroidal-type continuously variable transmission. In this example, the input disc 2 and the output disc 4 are rotatably supported around a cylindrical input shaft 15 by means of needle bearings 16, individually. A through hole 17 having a circular cross section is formed in the central portion of each of the discs 2 and 4. The holes 17 are formed extending in the axial direction of the input shaft 15 through the respective inner side faces 2a and 4a and outer side faces of the discs 2 and 4. Each needle bearing 16 is provided between the inner peripheral surface of its corresponding through hole 17 and the outer peripheral surface of an intermediate portion of the input shaft 15. A retaining groove 18 is formed on the inner peripheral surface of an end portion of each hole 17. A snap ring 19 is fitted in each retaining groove 18. The rings 19 in the grooves 18 prevent the needle bearings 16 from slipping out of through holes 17 toward the inner side faces 2a and 4a of the discs 2 and 4. The loading cam 10 is mounted on an end portion 15c (left-hand end portion in FIG. 6) of the input shaft 15 by spline fitting. A flange portion 20 prevents the cam 10 from moving away from the input disc 2. The loading cam 10 and the rollers 12 constitute the loading cam device 9, which rotates the input disc 2 while pressing it toward the output disc 4 as the input shaft 15 rotates. An output gear 21 is coupled to the output disc 4 by means of a key 22. Thus, the disc 4 and the gear 21 can rotate in synchronism with each other.

As shown in FIG. 7, the opposite end portions of the trunnions 6 are supported by means of a pair of support plates 23. The trunnions 6 are rockable around their corresponding pivots 5 and movable in the axial direction (horizontal direction in FIG. 7) of the pivots 5. Each displacement shaft 7 is inserted in a circular hole 24 that is formed in the central portion of each trunnion 6. Each shaft 7 includes a support shaft portion 25 and a pivot portion 26 that extend parallel and eccentrically to each other. The support shaft portion 25 is rotatably supported in each trunnion 6 by means of a radial needle bearing 27 that is fitted in the hole 24. Each power roller 8 is rotatably supported on its corresponding pivot portion 26 by means of a radial needle bearing 28.

The paired displacement shafts 7 are located diametrically opposite to each other with respect to the input shaft 15. The pivot portions 26 are eccentric to their corresponding support shaft portions 25 in the same direction with respect to the rotating direction of the discs 2 and 4. The direction of their eccentricity is substantially perpendicular to the axial direction of the input shaft 15. Accordingly, each power roller 8 can move for a certain distance in the axial direction of the input shaft 15. The power rollers 8, movable in this manner, are allowed to shift their positions in the axial direction of the input shaft 15 even if the discs 2 and 4, power rollers 8, etc. are elastically deformed by substantial loads that act thereon during torque transmission. Thus, those components can avoid being subjected to excessive forces.

A thrust ball bearing 29 and a thrust needle bearing 30 are interposed between each power roller 8 and its corresponding trunnion 6. The ball bearing 29 supports a thrust load on the power roller 8 and allows the roller 8 to rotate. The needle bearing 30 supports a thrust load from the power roller 8 that acts on an outer race 31 of the ball bearing 29. Further, the bearing 30 allows the pivot portion 26 and the outer race 31 to rock around the support shaft portion 25.

A driving rod 32 is coupled to one end portion (left-hand end portion in FIG. 7) of each trunnion 6. A driving piston 33 is fixed to the outer peripheral surface of an intermediate portion of each rod 32. Each piston 33 is stored liquid-tight in a driving cylinder 34.

In the toroidal-type continuously variable transmission constructed in this manner, the rotation of the input shaft 15 is transmitted to the input disc 2 through the loading cam device 9. The rotation of the input disc 2 is transmitted to the output disc 4 through the power rollers 8. The rotation of the output disc 4 is transmitted to the output gear 21. In changing the ratio between the respective rotating speeds of the input shaft 15 and the output gear 21, the paired driving pistons 33 are displaced in opposite directions. As the pistons 33 are displaced in this manner, the paired trunnions 6 are displaced in opposite directions. In FIG. 7, for example, the lower power roller 8 moves to the right, and the upper power roller 8 to the left. As a result, the directions of tangential forces that act on the regions where the respective outer peripheral surfaces 8a of the power rollers 8 and the inner side faces 2a and 4a of the discs 2 and 4 are in contact with one another change. As the directions of those forces change in this manner, the trunnions 6 tilt in opposite directions around their corresponding pivots 5. In consequence, as in the case shown in FIGS. 4 and 5, the positions of contact between the respective outer peripheral surfaces 8a of the power rollers 8 and the inner side faces 2a and 4a of the discs change, so that the speed ratio between the input shaft 15 and the output gear 21 changes.

As power is transferred between the input shaft 15 and the output gear 21, the contact regions between the components are subjected to some elastic deformation by transmitted loads. Since each power roller 8 is displaced in the axial direction of the input shaft 15 in response to the elastic deformation, the displacement shaft 7 that supports the roller 8 slightly rotates around its corresponding support shaft portion 25. AS this is done, the outer race 31 of each thrust ball bearing 29 and its corresponding trunnion 6 are displaced relatively to each other. Since the thrust needle bearing 30 is interposed between the outer race 31 and the trunnion 6, the relative displacement requires only a small force. Thus, the angle of inclination of each displacement shaft 7 can be changed with a small force.

Described in Jpn. Pat. Appln. KOKAI Publication Nos. 1-234646, 7-158711, 8-21503, and 8-35549 are toroidal-type continuously variable transmissions of the double-cavity type that have been developed to increase torque to be transmitted from an input shaft to an output shaft. As shown in FIGS. 8 and 9, one such double-cavity transmission comprises two input discs 2A and 2B and two output discs 4 that surround an input shaft 15a. The discs 2A, 2B and 4 are arranged in parallel with one another with respect to the direction of power transmission.

In the toroidal-type continuously variable transmission shown in FIGS. 8 and 9, an output gear 21a is provided on an intermediate portion of the input shaft 15a. The output gear 21a is rotatable with respect to the input shaft 15a. A cylindrical sleeve 35 is provided in the central portion of the output gear 21a. The two output discs 4 are fixed individually to the opposite end portions of the sleeve 35 by spline fitting. A needle bearing 16 is provided between the inner peripheral surface of a through hole 17 in the central portion of each output disc 4 and the outer peripheral surface of the input shaft 15a. The bearing 16 supports each output disc 4 and the output gear 21a for rotation around the input shaft 15a and movement in the axial direction. The input discs 2A and 2B on the opposite end portions of the input shaft 15a can rotate together with the shaft 15a. The input shaft 15a is rotated by means of a driving force transmitted from a drive shaft 36 on the left-hand side of FIG. 8 through the loading cam device 9. A radial bearing 37 is provided between the outer peripheral surface of the distal end portion of the shaft 36 and the inner peripheral surface of the proximal end portion of the input shaft 15a. A sliding bearing or needle bearing is used as the bearing 37. The radial bearing 37 connects the drive shaft 36 and the input shaft 15a so that they can be relatively displaced for a certain distance in the rotating direction without changing their coaxial relation.

A coned disk spring 39, which can generate a relatively great repulsive load, is interposed between the back surface of the first input disc 2A on the right-hand side of FIG. 8 and a loading nut 38 on the input shaft 15a. The nut 38, aided by the spring 39, restrains the input disc 2A from being displaced relatively to the shaft 15a in the axial direction. The second input disc 2B that faces the loading cam 10 is allowed, by a ball spline 40, to be displaced relatively to the input shaft 15a in the axial direction. A retaining step portion 41 is formed on the outer peripheral surface of an intermediate portion (near the ball spline 40) of the input shaft 15a. A coned disk spring 42 is interposed between the step portion 41 and an end face of the input disc 2B. The spring 42 generates a repulsive load smaller than the one generated by the spring 39. The repulsive load from the spring 39 applies a pilot pressure to the contact regions between the inner side faces 2a and 4a of the discs 2A, 2B and 4 and the respective outer peripheral surfaces 8a of the power rollers 8. Based on this pilot pressure, a contact pressure can be applied to the contact regions even when the loading cam device 9 produces no thrust or only a small thrust. Thus, the toroidal-type continuously variable transmission can transmit even low torque.

The output gear 21a is supported in an intermediate wall 43 inside the housing by means of angular ball bearings 44 so as to be rotatable and immovable in the axial direction. In the toroidal-type continuously variable transmission of the double-cavity type, at least one of the input discs 2A and 2B is allowed to move in the axial direction of the input shaft 15a by means of the ball spline 40. This is done in order that the input discs 2A and 2B, which are rotatable in synchronism with each other, can move for a certain distance in the axial direction of the input shaft 15a in response to the elastic deformation of the components that is caused by the force of pressure from the loading cam device 9.

When the toroidal-type continuously variable transmission of the double-cavity type with the above-described construction is operated, the rotation of the drive shaft 36 is transmitted to the second input disc 2B through the loading cam device 9. As the rotation of the input disc 2B is transmitted to the first input disc 2A through the input shaft 15a, the two input discs 2A and 2B rotate synchronously. The respective rotations of the input discs 2A and 2B are transmitted individually to their corresponding output discs 4 via the power rollers 8. In consequence, the sleeve 35 that is in spline-engagement with the output discs 4 rotates. As the sleeve 35 rotates, the output gear 21a rotates. Thus, in the toroidal-type continuously variable transmission of the double-cavity type, the torque transferred from the drive shaft 36 to the output gear 21a is transmitted through two power transmission lines (two input discs 2A and 2B and two output discs 4) that are arranged in parallel with each other. Accordingly, the double-cavity transmission can transmit higher torque than a toroidal-type continuously variable transmission of the single-cavity type (shown in FIGS. 4 and 5). In the double-cavity transmission, moreover, the gear ratios between the discs 2A, 2B and 4 can be changed in synchronism with each other by synchronously changing the angle of inclination of the power roller 8 between the one input disc 2A and its corresponding output disc 4 and that of the power roller 8 between the other input disc 2B and its corresponding output disc 4.

In the case where toroidal-type continuously variable transmission is incorporated in an actual automobile, a toroidal-type continuously variable transmission 47 and an epicyclic train 50 may be combined in the manner shown in FIG. 10. In the continuously variable transmission unit that combines the toroidal-type transmission 47 and the epicyclic train 50, a drive shaft (crankshaft) 46 of an engine 45 for use as a drive source is connected to an input shaft of the transmission 47. The transmission 47 is constructed in the same manner as the one shown in FIGS. 6 and 7. An output shaft 49 for rotating the driving wheels of the automobile is coupled to a sun gear that constitutes part of the epicyclic train 50. The output shaft 49 rotates integrally with the sun gear. Conventional differential gears are arranged between the output shaft 49 and the driving wheels.

The output discs of the toroidal-type continuously variable transmission 47 and members that constitute part of the epicyclic train 50 are connected by means of a first power transmission device 52 so that they can transmit turning effort. The input shaft of the transmission 47 and the drive shaft 46 are connected to the other members of the epicyclic train 50 by means of a second power transmission device 53 so that they can transmit turning effort. Further, the continuously variable transmission unit is provided with switching means for switching the state of transmission between the drive shaft 46 and the output shaft 49 to a high-speed drive mode, low-speed drive mode, or reverse mode. In this continuously variable transmission unit, the ratio ($\beta/\alpha$) between a reduction ratio a of the first power transmission device 52 and a reduction ratio $\beta$ of the second power transmission device 53 is made substantially equal to a reduction ratio (reduction ratio between the input and output shafts 1 and 3 in the state shown in FIG. 5) $i_H$ for the maximum acceleration of the toroidal-type continuously variable transmission 47.

The continuously variable transmission unit shown in FIG. 10 is of the power-split type as it is called. The transmission unit of this type is designed so that all the power (torque) applied to the drive shaft 46 is transmitted to the output shaft 49 through the toroidal-type continuously variable transmission 47 in the low-speed drive mode. In the high-speed drive mode, on the other hand, the power applied to the drive shaft 46 is transmitted to the output shaft 49 through the epicyclic train 50, and is partially applied to the output discs of the transmission 47 through the epicyclic train 50. Thus, the driving force of the engine 45 is transmitted to the output shaft 49 through only the transmission 47 in the low-speed drive mode. In the high-speed drive mode, the driving force of the engine 45 is transmitted to the output shaft 49 by means of the epicyclic train 50. By doing this, the torque applied to the transmission 47 in the high-speed drive mode can be lessened to improve the durability of the components of the transmission 47, and the torque transfer efficiency of the continuously variable transmission unit can be improved as a whole.

However, the conventional continuously variable transmission unit of the power-split type cannot always efficiently transmit high power. In a continuously variable transmission unit described in Jpn. Pat. Appln. KOKAI Publication No. 1-169169, for example, a toroidal-type continuously variable transmission of the single-cavity type is combined with two epicyclic trains. Therefore, the conventional transmission unit is large-sized and complicated in construction, and cannot efficiently transmit high torque for its heavy weight. A continuously variable transmission unit described in Jpn. Pat. Appln. KOKAI Publication No. 1-312266 is subject to the same problem.

Described in Jpn. Pat. Appln. KOKAI Publication No. 9-89072 is a continuously variable transmission unit of the so-called geared-neutral type, which combines a toroidal-type continuously variable transmission and an epicyclic train. The transmission unit of this type is designed so the that driving force is transmitted through the epicyclic train and the transmission in the low-speed drive mode and through only the transmission in the high-speed drive mode. In the case of the transmission unit of this geared-neutral type, the toroidal-type continuously variable transmission is subjected to high torque during the period from the start of drive to the low-speed drive mode. Accordingly, the transfer efficiency is low, and it is hard to reconcile the durability and compactness of the components of the transmission. A continuously variable transmission unit described in Jpn. Pat. Appln. KOKAI Publication No. 10-103461 is subject to the same problem.

BRIEF SUMMARY OF THE INVENTION

Accordingly, the object of the present invention is to provide a continuously variable transmission unit, which, enjoying high power transfer efficiency and good durability, can be reduced in size and weight. This object can be attained by rationalizing the combination of a toroidal-type continuously variable transmission and an epicyclic train.

In order to achieve the above object, a continuously variable transmission unit according to the present invention comprises an input shaft rotatable by means of a drive shaft, an output shaft for fetching power based on the rotation of the input shaft, a toroidal-type continuously variable transmission, an epicyclic train, a first power transmission device for transferring turning effort between part of the epicyclic train and the output discs of the continuously variable transmission, a second power transmission device for directly transmitting the turning effort from the input shaft to the remaining part of the epicyclic train without the passage through the transmission, and switching means for switching the state of transmission between the input and output shafts to a high-speed drive mode, low-speed drive mode, or reverse mode. The first and second power transmission devices may be transmission mechanisms that include gear trains or chains and sprockets.

The toroidal-type continuously variable transmission is of the double-cavity type. This transmission includes a pair of input discs and a pair of output discs arranged coaxially and in parallel with one another with respect to the direction of power transmission, and power rollers located between the input discs and the output discs. The transmission can synchronously change the gear ratios between the input discs and the output discs by synchronously changing the respective angles of inclination of the power rollers.

In the toroidal-type continuously variable transmission described above, the pressure device and the epicyclic train are arranged between the first and second power transmission devices with respect to the axial direction of the input and output shafts. The pressure device presses the input and output discs toward one another. A loading cam device or hydraulic loading device may be used as the pressure device.

The continuously variable transmission unit according to the present invention operates in the following manner. First, in the low-speed drive mode, the power of the input shaft is transmitted to the output shaft through the toroidal-type continuously variable transmission. Thus, in the low-speed drive mode, a sun gear, ring gear, and carrier that constitute the epicyclic train are coupled in any combination. By doing this, the sun gear, the ring gear and the carrier are allowed to rotate integrally around the sun gear. In this state, the rotation of the input shaft is transmitted to the output shaft through the toroidal-type continuously variable transmission only. In this low-speed drive mode, the gear ratio between the input and output discs can be changed in the same manner as in the case of the toroidal-type continuously variable transmission of the double-cavity type shown in FIGS. 8 and 9. Thus, in the low-speed drive mode, the reduction gear ratio between the input and output shafts, that is, the reduction ratio of the entire transmission unit, is equal to the reduction ratio of the toroidal-type continuously variable transmission. The torque that is applied to the continuously variable transmission in the low-speed drive mode is equal to the torque that acts on the input shaft.

The transfer efficiency for the power transmitted from the input shaft to the output shaft in the low-speed drive mode (or the transfer efficiency of the entire continuously variable transmission unit) depends on the transfer efficiency of the toroidal-type continuously variable transmission itself. In the continuously variable transmission of the double-cavity type that constitutes the continuously variable transmission unit of the invention, thrust load that is produced in the pressure device (loading cam device or the like) can be canceled in the transmission unit. Accordingly, no substantial thrust load acts on rolling bearings that support the input and output discs, so that torque applied to each rolling bearing can be prevented from increasing. Thus, the transfer efficiency of the toroidal-type continuously variable transmission is enhanced, so that the transfer efficiency of the entire transmission unit that incorporates the transmission is also enhanced.

FIG. 11A shows the relation between torque applied to a toroidal-type continuously variable transmission of the single-cavity type and the transfer efficiency of this transmission. FIG. 11B shows the relation between torque applied to the toroidal-type continuously variable transmission of the double-cavity type and the transfer efficiency of this transmission. In these drawings, the axes of ordinate and abscissa represent the transfer efficiency and input torque (N·m), respectively. In FIGS. 11A and 11B, "i" indicates the gear ratio between the input and output discs that constitute the toroidal-type continuously variable transmission. When the value of "i" is smaller than 1, the transmission is in an acceleration state. If the torque to be transmitted is high, in particular, as seen from FIGS. 11A and 11B, the transmission of the double-cavity type can enjoy higher transfer efficiency than the transmission of the single-cavity type. Besides, the double-cavity transmission can transmit higher power than the single-cavity transmission. Thus, the continuously variable transmission unit of the present invention can transmit higher power with a higher efficiency.

In the high-speed drive mode, according to the continuously variable transmission unit of the invention, power is transmitted through the epicyclic train and partially applied to the toroidal-type continuously variable transmission through the epicyclic train. In this case, torque is transferred from the epicyclic train to the output discs that constitute the transmission. In this state, the gear ratio of the entire transmission unit changes depending on differences between the respective rotating speeds of the sun gear, ring gear, and carrier. In other words, the gear ratio of the entire transmission unit can be adjusted if the speed differences between the sun gear, ring gear, and carrier are changed by changing the gear ratio of the toroidal-type continuously variable transmission. As the gear ratio of the transmission is changed to the deceleration side, in this case, the gear ratio of the entire transmission unit changes to the acceleration side. In the high-speed drive mode, therefore, if the gear ratio of the continuously variable transmission is changed to the deceleration side to change that of the transmission unit to the acceleration side, then the torque applied to the transmission is lowered in proportion. In consequence, the individual components of the transmission can enjoy improved durability and higher transfer efficiency.

According to the present invention, as described above, the continuously variable transmission unit of the power-split type is formed by combining the toroidal-type continuously variable transmission and the epicyclic train, so that the torque that passes through the transmission can be lessened. Accordingly, loads that act on the input and output discs of the transmission, power rollers, and other components that are concerned in torque transmission can be reduced, so that those components can maintain satisfactory durability.

FIG. 12A shows the relation between the reduction ratio of a continuously variable transmission unit of the geared-neutral type provided with the toroidal-type continuously variable transmission and the level of torque transmitted by means of the power rollers. FIG. 12B shows the relation between the reduction ratio of a continuously variable transmission unit of the power-split type provided with the toroidal-type continuously variable transmission and the level of torque transmitted by means of the power rollers. In these drawings, the axis of abscissa represents the inverse number of the reduction ratio of the continuously variable transmission unit. The axis of ordinate represents the ratio (T/t) between torque T that passes through the power rollers and torque t applied to the input shaft of the transmission unit. In FIGS. 12A and 12B, arrows A and B individually indicate timings for switching between the low- and high-speed drive mode. In the continuously variable transmission unit of the power-split type according to the present invention (FIG. 12B), as seen from FIGS. 12A and 12B, the torque T that passes through the toroidal-type continuously variable transmission in the low-speed drive mode is equivalent to the torque t applied to the input shaft of the transmission unit (T/t=1). In the high-speed drive mode, the torque T that passes through the transmission is lower than the torque t applied to the input shaft (T/t<1). In the case of the continuously variable transmission unit of the geared-neutral type (FIG. 12A), on the other hand, the torque T that passes through the transmission in the high-speed drive mode is equivalent to the torque t applied to the input shaft of the transmission unit (T/t=1). In the low-speed drive mode, in this case, the torque T that passes through the transmission is much higher than the torque t applied to the input shaft of the transmission unit (T/t>1). In the continuously variable transmission unit of the power-split type according to the invention, as seen from FIGS. 12A and 12B, the torque T that passes through the transmission is so low that loads acting on the individual components of the transmission can be reduced. If the continuously variable transmission unit according to the invention is used as an automotive transmission unit, the durability of the toroidal-type continuously variable transmission can be maintained without carrying out troublesome control such as lowering the engine output in the low-speed drive mode.

The continuously variable transmission unit of the present invention enjoys high power transfer efficiency and good durability, and can be reduced in size and weight. It is to be understood that the continuously variable transmission unit of the invention is adapted for use in any automobile. However, it is particularly suited for use in a front engine-front drive car.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
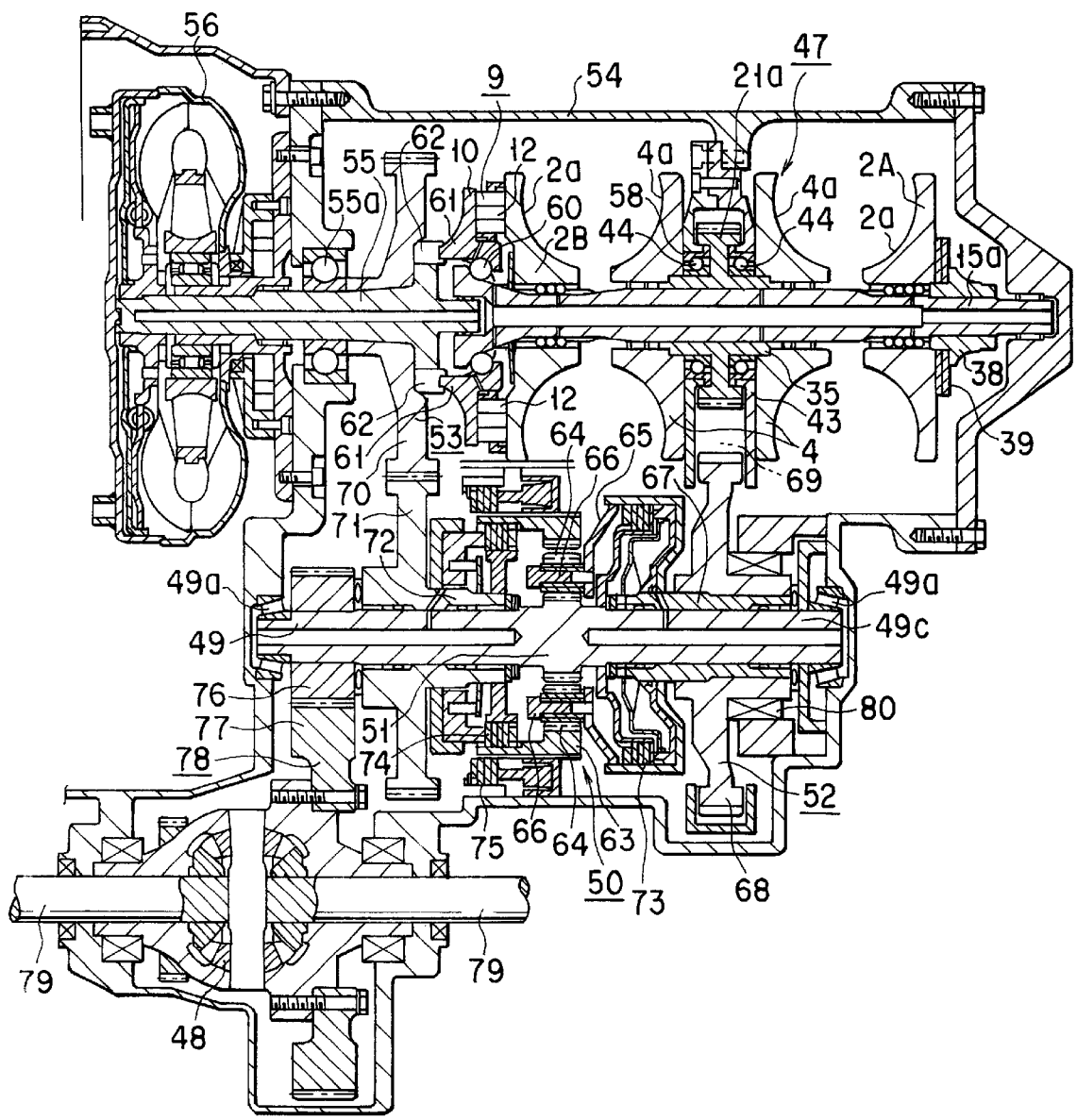
FIG. 1 is a sectional view of a continuously variable transmission unit according to a first embodiment of the present invention.
Figure 2:
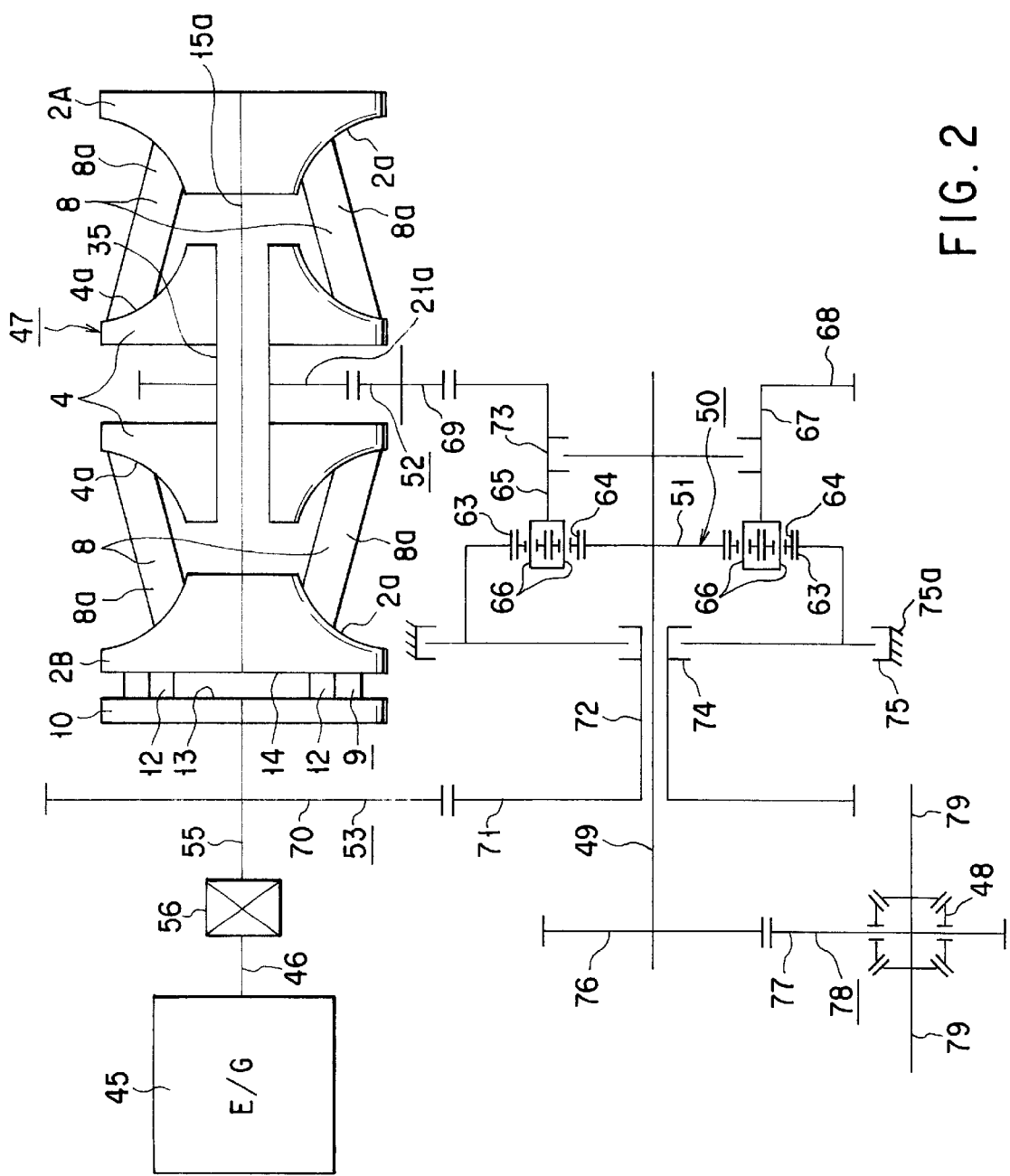
FIG. 2 is a diagram schematically showing an arrangement of the continuously variable transmission unit shown in FIG. 1.

A continuously variable transmission unit according to a first embodiment of the present invention will now be described with reference to FIGS. 1 and 2.

This continuously variable transmission unit has an input shaft 55. The input shaft 55 is connected to a drive shaft (crankshaft) 46 of an engine 45 for use as a drive source by means of a starting clutch 56, and is rotated by means of the engine 45. The clutch 56, e.g., a torque converter or electromagnetic clutch, is connected in series with the drive shaft 46 and the input shaft 55 between the input-side end portion (left-hand end portion in FIG. 1) of the input shaft 55 and the output-side end portion (right-hand end portion in FIG. 1) of the drive shaft 46. In the case shown in FIG. 1, the drive shaft 46 and the input shaft 55 are coaxial with each other. An output shaft 49 for fetching power based on the rotation of the input shaft 55 is located parallel to the shaft 55 so as to be rotatable independently of the shaft 55. A casing 54, which contains the continuously variable transmission unit therein, is provided with a toroidal-type continuously variable transmission 47 that is situated near the input shaft 55. An epicyclic train 50 is located close to the output shaft 49. The input and output shafts 55 and 49 are supported inside the casing 54 by means of rolling bearings 55a and 49a, respectively, so as to be rotatable and immovable in the axial direction.

Figure 8:
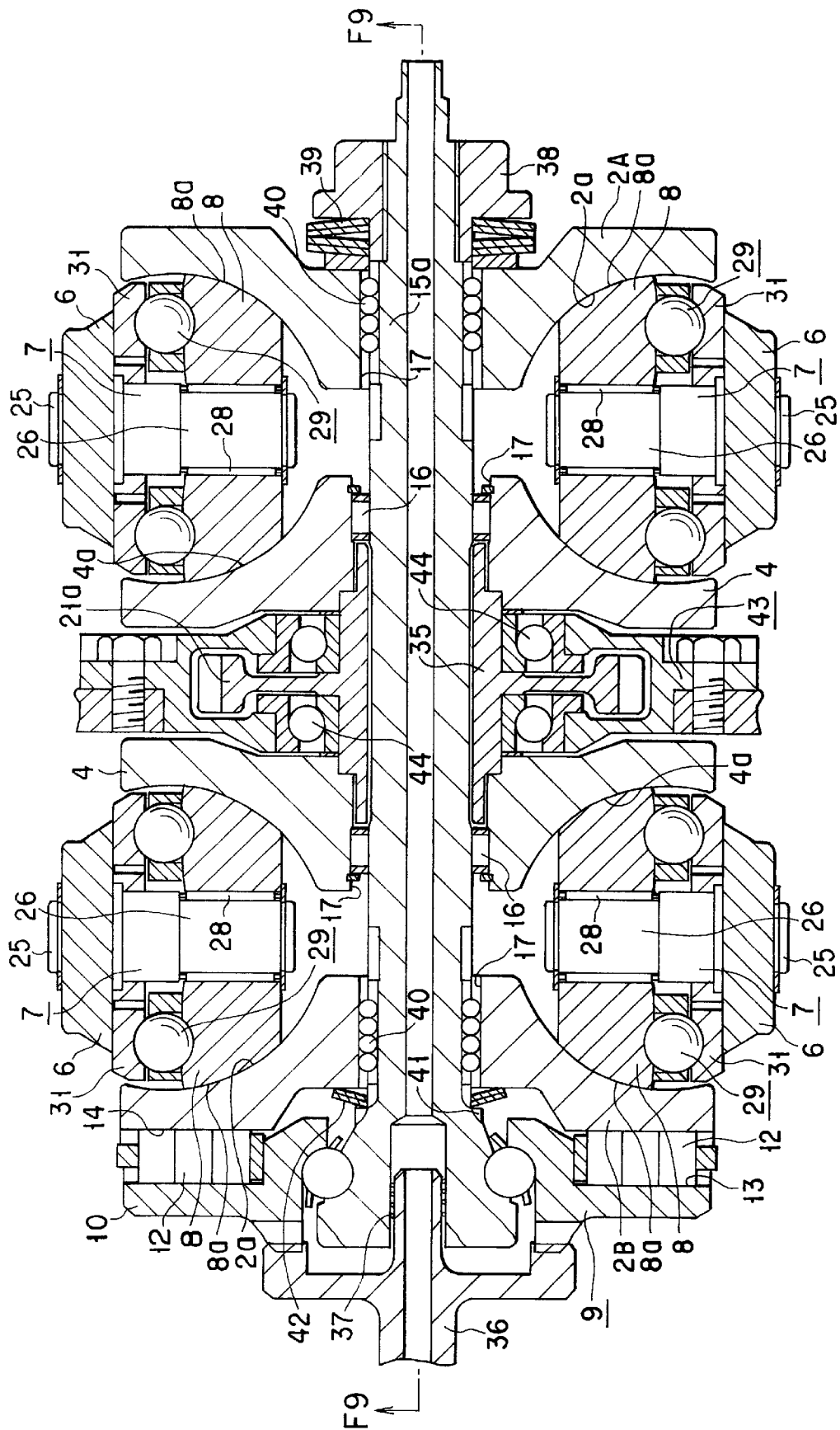
FIG. 8 is a sectional view of a continuously variable transmission of the double-cavity type constituting the continuously variable transmission unit of the invention.
Figure 9:
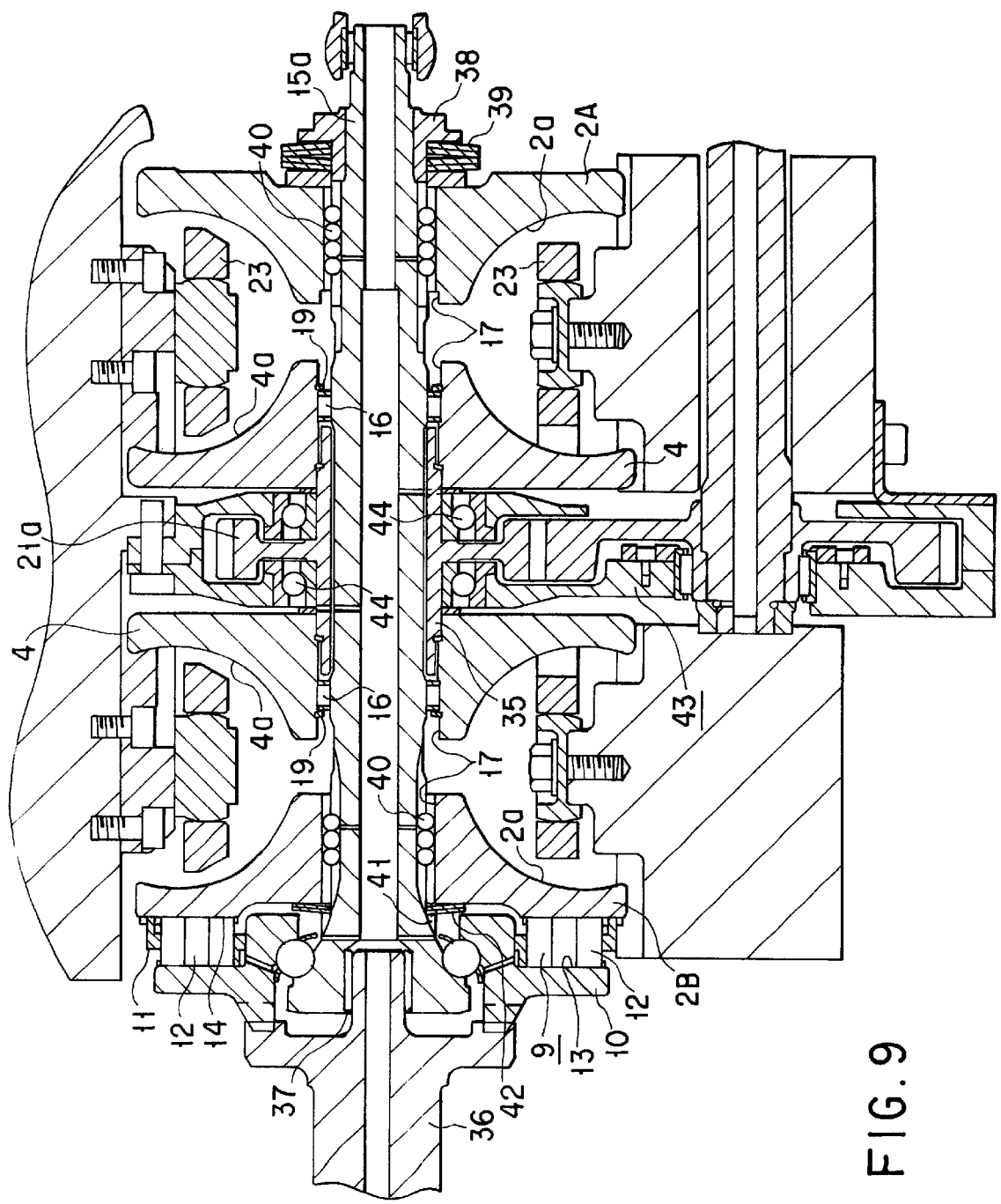
FIG. 9 is a sectional view of the continuously variable transmission taken along line F9—F9 of FIG. 8.
Figure 10:
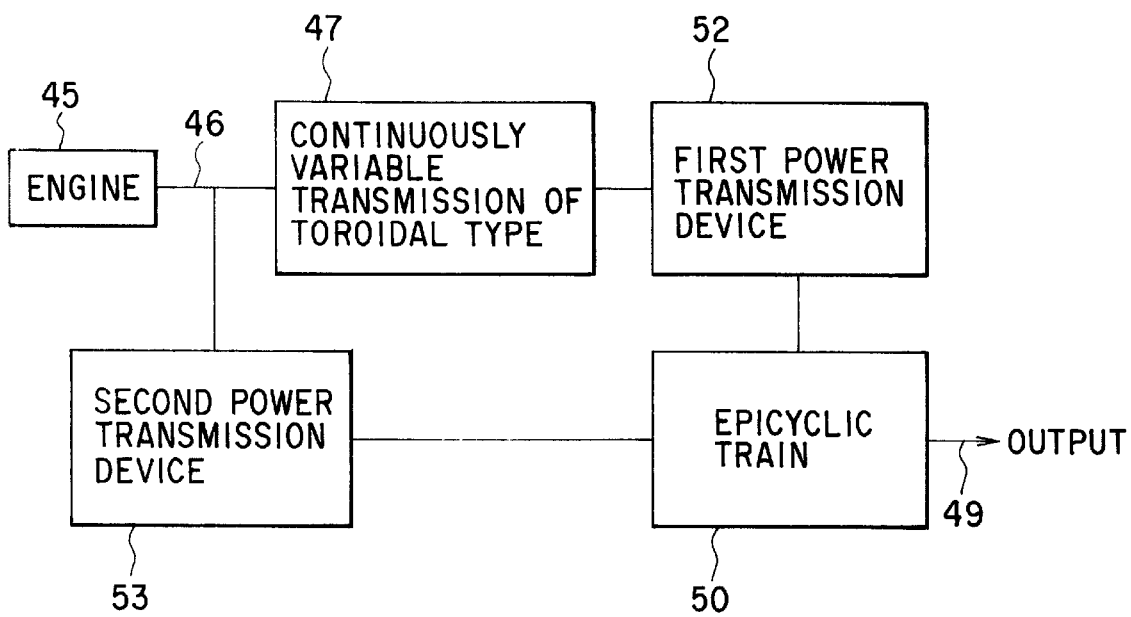
FIG. 10 is a block diagram schematically showing an arrangement of a continuously variable transmission unit of the power-split type used in the invention.

The continuously variable transmission 47 of the double-cavity type is constructed in the same manner as the one shown in FIGS. 8 and 9. The transmission 47 includes a pair of input discs 2A and 2B and a pair of output discs 4. These discs 2A, 2B and 4 are arranged around one input shaft 15a in a manner such that they are coaxial and in parallel with one another with respect to the direction of power transmission. The input shaft 15a of the transmission 47 is coaxial with the input shaft 55 of the continuously variable transmission unit as an entire structure. The paired input discs 2A and 2B are supported individually on the opposite end portions of the input shaft 15a so as to be rotatable synchronously with the shaft 15a. The paired output discs 4 are supported on an axially intermediate portion of the input shaft 15a for synchronous rotation around the shaft 15a.

The output discs 4 are fixed individually to the opposite end portions of a sleeve 35 by spline fitting. The sleeve 35 is rotatably supported in an intermediate wall 43 that is fixed inside the casing 54. The wall 43 has a dual structure. The sleeve 35 is passed through a through hole 58 that is formed in the wall 43. The sleeve 35 is supported in the intermediate wall 43 by means of a pair of rolling bearings, e.g., angular ball bearings 44 that can support radial and thrust loads, so as to be rotatable and immovable in the axial direction. An output gear 21a that constitutes part of a first power transmission device 52 is fixed to an axially intermediate portion of the sleeve 35 between the ball bearings 44.

A plurality of power rollers 8, normally two or three in number, are arranged between an inner side face 2a of the first input disc 2A and an inner side face 4a of the output disc 4 that is opposed to the disc 2A. A plurality of power rollers 8 are also arranged between an inner side face 2a of the second input disc 2B and an inner side face 4a of the output disc 4 that is opposed to the disc 2B. The respective outer peripheral surfaces 8a of the power rollers 8 are in contact with the respective inner side faces 2a and 4a of the discs 2A, 2B and 4, individually. Each power roller 8 is rotatably supported on a trunnion 6 by means of a displacement shaft 7 (shown in FIG. 8). This toroidal-type continuously variable transmission 47 is constructed in the same manner as the toroidal-type continuously variable transmission of the double-cavity type shown in FIGS. 8 and 9. Thus, the individual trunnions 6 rock synchronously with each other so that the respective angles of inclination of the displacement shafts 7 that individually support the power rollers 8 change synchronously. As this is done, the gear ratio between the first input disc 2A and its corresponding output disc 4 and that between the second input disc 2B and its corresponding output disc 4 change synchronously.

The toroidal-type continuously variable transmission 47 is provided with a loading cam device 9 that serves as a pressure device. A cam plate 10 that constitutes part of the loading cam device 9 is rotatably supported on the input-side end portion (left-hand end portion in FIG. 1) of the input shaft 15a by means of a rolling bearing 60. An angular ball bearing is used as an example of the rolling bearing 60. As the loading cam device 9 is actuated, the bearing 60 transmits a thrust load that acts on the cam plate 10 to the input shaft 15a. Protrusions 61 are formed on the back surface of cam plate 10. The input shaft 55 is provided with driving arms 62. As the protrusions 61 and the arms 62 engage one another, the cam plate 10 can rotate in synchronism with the input shaft 55. The second input disc 2B, which is situated near the loading cam device 9, is pressed toward its corresponding output disc 4 as it rotates accompanying the rotation of the input shaft 55. At the same time, the first input disc 2A is also pressed toward its corresponding output disc 4 as it rotates.

A sun gear 51 that constitutes the epicyclic train 50 is fixed to an axially intermediate portion of the output shaft 49. Accordingly, the output shaft 49 rotates as the gear 51 rotates. A ring gear 63 is located around the sun gear 51 in a manner such that it can rotate coaxially with and independently of the sun gear 51. A plurality of planet gear assemblies 64 (normally three to four assemblies) are arranged between the inner peripheral surface of the ring gear 63 and the outer peripheral surface of the sun gear 51. Each planet gear assembly 64 includes a pair of planet gears that are in mesh with each other. In each planet gear assembly 64, one planet gear is in mesh with the ring gear 63, and the other with the sun gear 51. A pair of planet gears are used for each planet gear assembly 64 in order to cause the sun gear 51 and the ring gear 63 to rotate in the same direction. If the gears 51 and 63 need not be made to rotate in the same direction owing to the arrangement of other components of the continuously variable transmission unit, one and the same planet gear may be made to mesh with both the gears 51 and 63.

Each pair of planet gears that constitute each planet gear assembly 64 are rotatably supported on pivots 66 that are attached to a carrier 65. The pivots 66 extend parallel to the output shaft 49. The carrier 65 is fixed coaxially to a cylindrical first transmission shaft 67. The shaft 67 is rotatably supported on a half portion 49c (right-hand portion in FIG. 1) of the output shaft 49 by means of rolling bearings such as needle bearings. A transmission gear 68 is fixed to the outer peripheral surface of the first transmission shaft 67 by spline fitting. The transmission gear 68 and the output gear 21a are in mesh with an intermediate gear 69 (shown in FIG. 2). The gears 68, 21a and 69 constitute the first power transmission device 52. The device 52 serves to transfer power between the output discs 4 of the toroidal-type continuously variable transmission 47 and the carrier 65 of the epicyclic train 50. As the output discs 4 rotate, the carrier 65 rotate in the same direction as the discs 4 at a speed corresponding to the ratio between the respective numbers of teeth of the output gear 21a and the transmission gear 68.

A second power transmission device 53 can transfer turning effort between the input shaft 55 and the ring gear 63 of the epicyclic train 50. The device 53 is composed of a driving gear 70 and a driven gear 71 that are in mesh with each other. The driving gear 70 is fixed to an axially intermediate portion of the input shaft 55 between the starting clutch 56 and the loading cam device 9. The driven gear 71 is situated on the other end side of an axially intermediate portion of the output shaft 49. A cylindrical second transmission shaft 72 is fixed to the driven gear 71. The shaft 72 is rotatably supported on the output shaft 49 by means of rolling bearings such as needle bearings. Thus, the driven gear 71 can rotate around the output shaft 49. In this embodiment, the respective numbers of teeth of the driving gear 70 and the driven gear 71 are equalized so that the reduction ratio of the second power transmission device 53 is 1. As the input shaft 55 rotates, therefore, the second transmission shaft 72 rotates at the same angular velocity as the input shaft 55 in the direction opposite to the rotating direction of the shaft 55.

The continuously variable transmission unit according to this embodiment comprises a clutch mechanism that includes a low-speed clutch 73, high-speed clutch 74, and reverse clutch 75. The low-speed clutch 73 is located between the first transmission shaft 67 and the output shaft 49. When the clutch 73 is connected, the sun gear 51 of the epicyclic train 50, ring gear 63, and planet gear assemblies 64 are prevented from shifting their relative positions, so that the gears 51 and 63 are coupled to each other by means of the planet gear assemblies 64. The high-speed clutch 74 is located between the second transmission shaft 72 and the ring gear 63. When the clutch 74 is connected, the second transmission shaft 72 and the ring gear 63 are coupled to each other. The reverse clutch 75 is located between the ring gear 63 and a stationary portion 75a in the casing 54. When the clutch 75 is connected, the ring gear 63 is fixed to the stationary portion 75a in the casing 54. If any one of the clutches 73, 74 and 75 is connected, the remaining two are disconnected by means of a hydraulic or electrical control circuit.

The output shaft 49 and a differential gear 48 are connected by means of a third power transmission device 78. The device 78 includes a second driving gear 76 and a second driven gear 77. When the output shaft 49 rotates, therefore, a pair of drive shafts 79, right and left, are rotated by means of the third power transmission device 78 and the differential gear 48, so that the right- and left-hand driving wheels of an automobile rotate. A one-way clutch 80 (shown in FIG. 1) is provided between the transmission gear 68 of the first power transmission device 52 and a stationary portion in the casing 54. The clutch 80 allows the members (first transmission shaft 67, transmission gear 68, etc.) of the toroidal-type continuously variable transmission 47 to rotate only in a given direction, and prevents them from rotating in the opposite direction.

The following is a description of the operation of the continuously variable transmission unit according to the first embodiment with the aforementioned construction. In a low-speed drive mode, the low-speed clutch 73 is connected, while the high-speed clutch 74 and the reverse clutch 75 are disconnected. If the drive shaft 46 is rotated and the starting clutch 56 is connected to rotate the input shaft 55 in this state, only the toroidal-type continuously variable transmission 47 transmits power to the output shaft 49 for the following reason. More specifically, if the low-speed clutch 73 is connected, the sun gear 51, carrier 65, and ring gear 63 are coupled to one another. Thus, the sun gear 51 of the epicyclic train 50, ring gear 63, and planet gear assemblies 64 are prevented from rotating relatively to one another. Since the high-speed clutch 74 and the reverse clutch 75 are disconnected, moreover, the carrier 65 is allowed to rotate without regard to the rotating speed of the driven gear 71 that is fixed to the second transmission shaft 72.

If the input shaft 55 rotates in this state, therefore, its rotation is transmitted to the input discs 2A and 2B through the loading cam device 9, and is further transmitted to the output discs 4 through the power rollers 8. The rotation of each output disc 4 is transmitted to the carrier 65 by means of the output gear 21a, intermediate gear 69, and transmission gear 68 that constitute the first power transmission device 52. Since the gears 51, 63 and 64 of the epicyclic train 50 are prevented from relative rotation in this low-speed drive mode, the output shaft 49 that is coupled to the sun gear 51 rotates at the same speed as the sun gear 51 and the carrier 65.

In the low-speed drive mode described above, the gear ratio between the input discs 2A and 2B and the output discs 4 can be changed in the same manner as in the case of the toroidal-type continuously variable transmission of the double-cavity type shown in FIGS. 8 and 9. Thus, the gear ratio between the input shaft 55 and the output shaft 49, that is, the gear ratio of the entire transmission unit, is equal to the gear ratio of the toroidal-type continuously variable transmission 47. Further, the torque that is applied to the continuously variable transmission 47 is equal to the torque that acts on the input shaft 55. In this low-speed drive mode, the driving gear 70 and the driven gear 71 that constitute the second power transmission device 53 race independently.

Figure 11A:
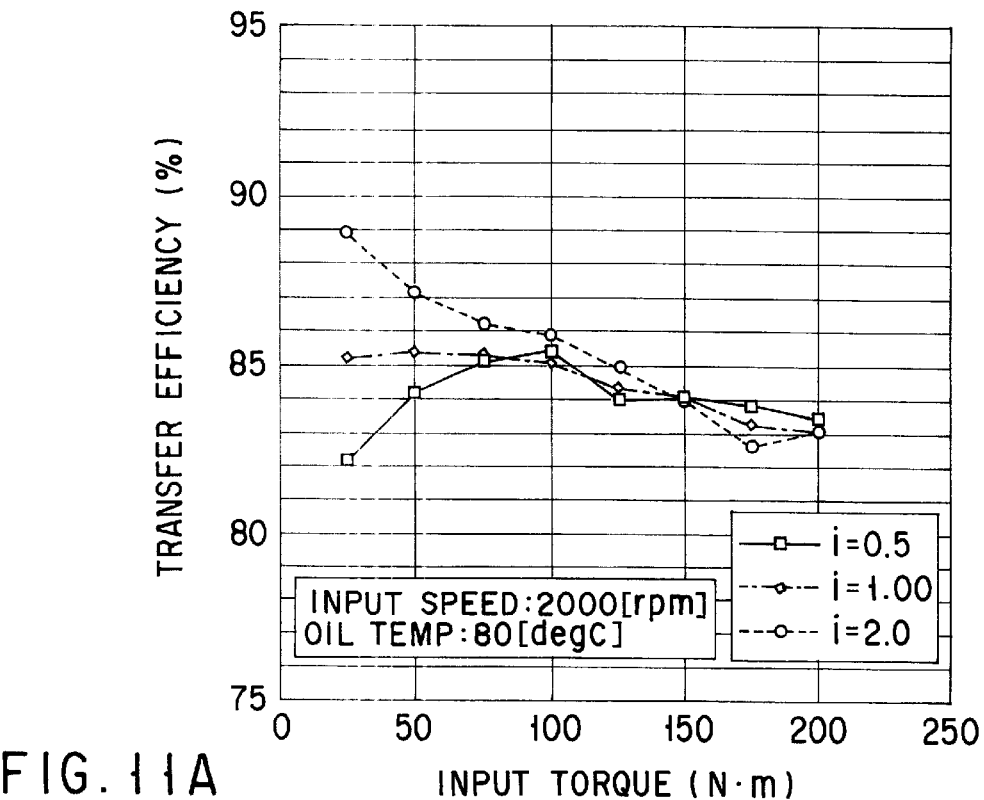
FIG. 11A is a diagram showing the relation between torque and the transfer efficiency of the toroidal-type continuously variable transmission of the single-cavity type.
Figure 11B:
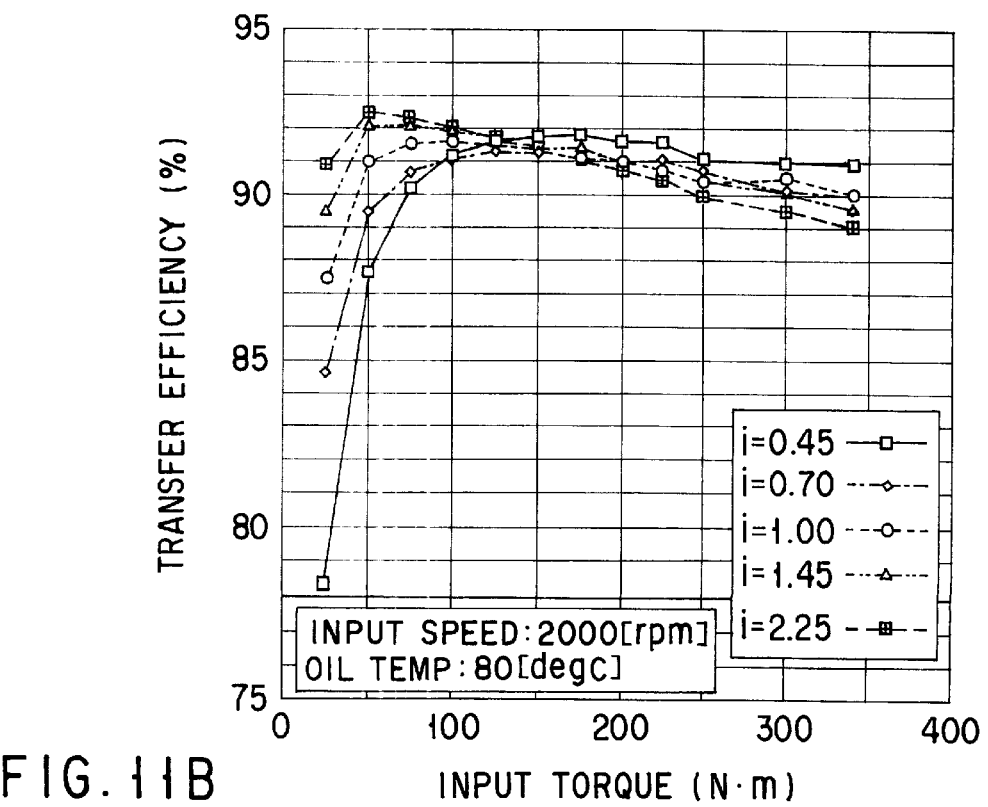
FIG. 11B is a diagram showing the relation between torque and the transfer efficiency of the toroidal-type continuously variable transmission of the double-cavity type.

Thus, in the low-speed drive mode, all the power that is transferred from the input shaft 55 to the output shaft 49 passes through the toroidal-type continuously variable transmission 47 only, so that the transfer efficiency of the entire transmission unit depends on that of the transmission 47 itself. According to the toroidal-type continuously variable transmission 47 of the double-cavity type that constitutes the continuously variable transmission unit of the present invention, thrust load that is produced in the loading cam device 9 is canceled inside the transmission 47. Thus, a rightward thrust load (in FIGS. 1 and 2) acts on the one input disc 2B, out of the paired input discs 2A and 2B, and its corresponding output disc 4 as the loading cam device 9 is actuated. On the other hand, a leftward thrust load with the same magnitude as the rightward one acts on the other input disc 2A and its corresponding output disc 4. These two opposite thrust loads are transferred to the input shaft 15a and the sleeve 35, and are canceled as they are balanced with each other in the shaft 15a and the sleeve 35. Thus, no substantial thrust load can act on rolling bearings that support the discs 2A, 2B and 4, through the input shaft 15a and the sleeve 35. In consequence, torque that is applied to each rolling bearing can be prevented from increasing. As seen from FIGS. 11A and 11B, therefore, the transfer efficiency of the continuously variable transmission 47 is enhanced, so that the transfer efficiency of the transmission unit that incorporates the transmission 47 is also enhanced.

In a high-speed drive mode, the high-speed clutch 74 is connected, while the low-speed clutch 73 and the reverse clutch 75 are disconnected. If the input shaft 55 rotates in this state, its rotation is transmitted to the output shaft 49 via the driving gear 70 and the driven gear 71 that constitute the second power transmission device 53 and the epicyclic train 50.

Thus, when the input shaft 55 rotates in the high-speed drive mode, this rotation is transferred to the ring gear 63 via the second power transmission device 53 and the high-speed clutch 74, whereupon the gear 63 rotates. As the rotation of the ring gear 63 is transmitted to the sun gear 51 through the planet gear assemblies 64, the output shaft 49 that is fixed to the gear 51 rotates. If the carrier 65 is supposed to be stationary when the ring gear 63 is on the input side, the epicyclic train 50 transfers power between the ring gear 63 and the sun gear 51 with use of a gear ratio (lower than 1) corresponding to the tooth number ratio between the gears 63 and 51. Actually, however, the carrier 65 rotates inside the ring gear 63, so that the gear ratio of the continuously variable transmission unit changes according to the rotating speed of the carrier 65. Accordingly, the gear ratio of the entire transmission unit can be changed in a manner such that the rotating speed of the carrier 65 is changed by varying the gear ratio of the toroidal-type continuously variable transmission 47.

In the high-speed drive mode, according to this embodiment, the carrier 65 rotates in the same direction as the ring gear 63 and the sun gear 51. The lower the rotating speed of the carrier 65, therefore, the faster the output shaft 49 that is attached to the sun gear 51 rotates. If the toroidal-type continuously variable transmission 47 is brought to a maximum acceleration state such that the respective rotating speeds (angular velocities) of the ring gear 63 and the carrier 65 are equal, for example, the gear 63 and the output shaft 49 rotate at the same speed. If the rotating speed of the carrier 65 is lower than that of the ring gear 63, on the other hand, the output shaft 49 rotates at a higher speed than the gear 63.

Thus, in the high-speed drive mode, the gear ratio of the whole continuously variable transmission unit changes to the acceleration side in proportion to the increase of the gear ratio (or change to the deceleration side) of the toroidal-type continuously variable transmission 47. In this high-speed drive mode, the transmission 47 is subjected to torque not from the input discs 2A and 2B but from the output discs 4. If the torque that acts in the low-speed drive mode is a positive torque, a negative torque acts in the high-speed drive mode. In the case of the continuously variable transmission unit according to this embodiment, the driving gear 70 of the second power transmission device 53 is located on the upper-stream side (on the side of the engine 45) of the loading cam device 9 with respect to the direction of power transmission. When the high-speed clutch 74 is connected, therefore, torque transferred from the engine 45 to the input shaft 55 is transmitted to the ring gear 63 of the epicyclic train 50 through the second power transmission device 53 before the loading cam device 9 presses the input disc 2A.

Accordingly, any torque is hardly transmitted from the input shaft 55 to the input discs 2A and 2B via the loading cam device 9.

Some of the torque transmitted to the ring gear 63 of the epicyclic train 50 through the second power transmission device 53 in the high-speed drive mode is transferred from each planet gear assembly 64 to each output disc 4 via the carrier 65 and the first power transmission device 52. If the reduction ratio of the toroidal-type continuously variable transmission 47 is made higher, that is, if the gear ratio of the entire continuously variable transmission unit is changed to the acceleration side, then torque that is transferred from each output disc 4 to the transmission 47 is lessened in proportion. In consequence, the torque applied to the transmission 47 is lowered in the high-speed drive mode, so that the durability of the transmission 47 is improved.

Figure 12A:
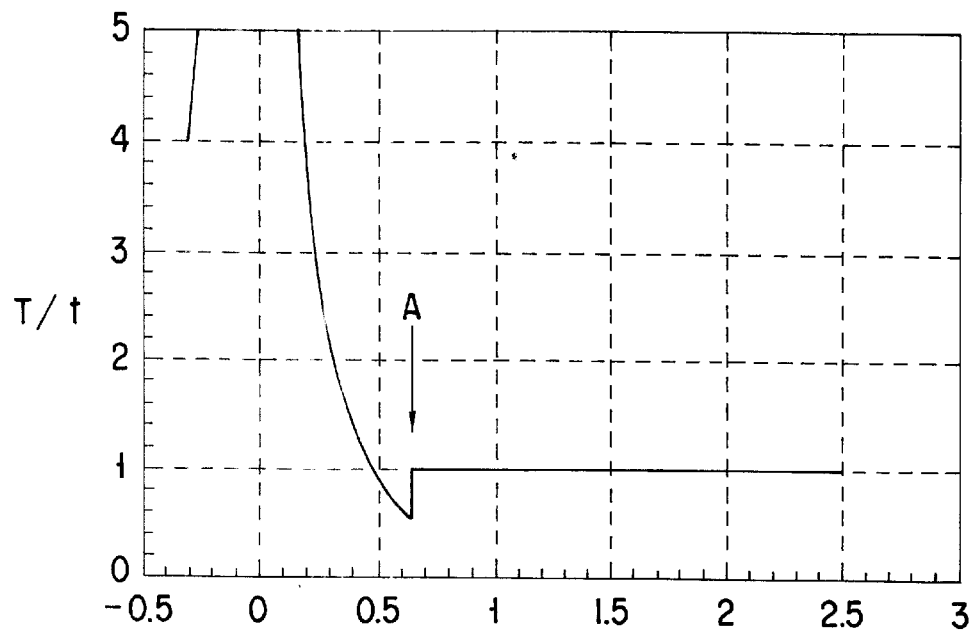
FIG. 12A is a diagram showing the relation between the reduction ratio of a continuously variable transmission unit of the geared-neutral type and torque passing through the toroidal-type continuously variable transmission of the unit.
Figure 12B:
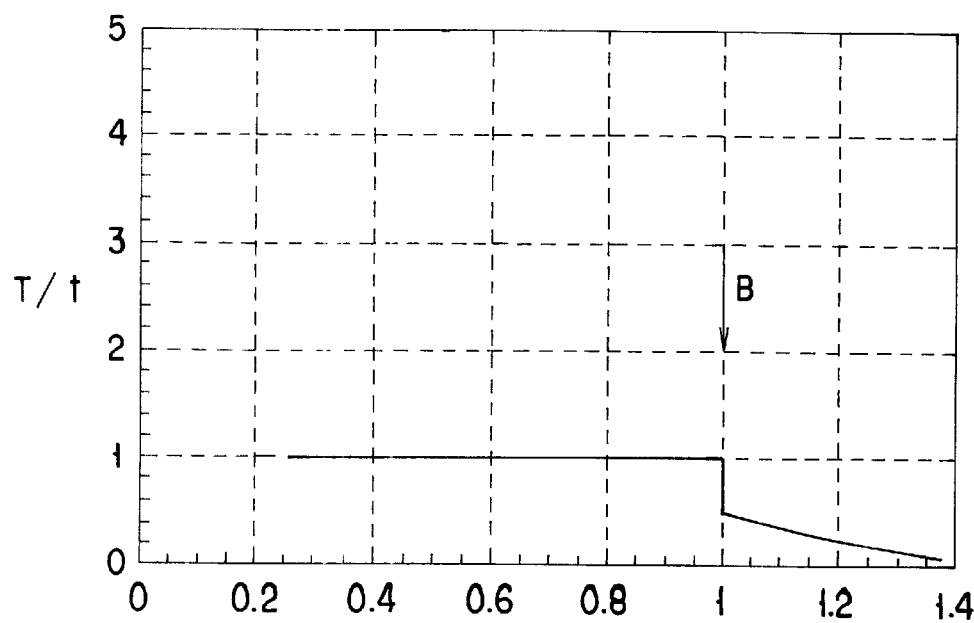
FIG. 12B is a diagram showing the relation between the reduction ratio of a continuously variable transmission unit of the power-split type and torque passing through the toroidal-type continuously variable transmission of the unit.

According to the first embodiment of the present invention, as described above, the continuously variable transmission unit of the power-split type is formed by combining the toroidal-type continuously variable transmission 47 and the epicyclic train 50, so that the torque applied to the transmission 47 can be restricted to a low level. Accordingly, loads that act on the discs 2A, 2B and 4, power rollers 8, and other members of the transmission 47 that are concerned in torque transmission are reduced, so that those members can maintain satisfactory durability. As seen from FIG. 12B, therefore, the torque that passes through the continuously variable transmission 47 can be reduced. In consequence, the thrust load that is produced in the loading cam device 9 is also reduced. Since surface pressures between the respective inner side faces 2a and 4a of the discs 2A, 2B and 4 and the outer peripheral surfaces 8a of the power rollers 8 also lower, the rolling fatigue life of the faces 2a, 4a and 8a can be prolonged. Thus, the durability of the toroidal-type continuously variable transmission 47 can be maintained without requiring any troublesome control, such as lowering the output of the engine 45 in the low-speed drive mode.

In the continuously variable transmission unit according to the first embodiment of the invention, as is evident from the above description, the gear ratio of the entire unit changes in proportion to the gear ratio of the toroidal-type continuously variable transmission 47 in the low-speed drive mode and in inverse proportion thereto in the high-speed drive mode. If the automobile in its standing state is expected to be speeded up gradually, therefore, the gear ratio of the transmission 47 gradually lowers (or changes to the acceleration side) as the vehicle speed increases with the low-speed clutch 73 connected. After the high-speed clutch 74 is connected, the gear ratio of the transmission 47 gradually increases (or changes to the deceleration side) as the vehicle speed increases. Thus, the gear ratio of the transmission 47 has a minimum (maximum acceleration state) when the drive mode is switched between the low- and high-speed modes. In the case of the continuously variable transmission unit of this embodiment, the ratio ($\beta/\alpha$) between a reduction ratio $\alpha$ (e.g., about 2) of the first power transmission device 52 and a reduction ratio $\beta$ (e.g., about 1) of the second power transmission device 53 is made substantially equal to a reduction ratio $i_H$ (e.g., about 0.5) for the maximum acceleration of the transmission 47. Accordingly, the gear ratio of the entire transmission unit can be restrained from changing suddenly when the drive mode is switched between the low- and high-speed modes. Thus, the drive mode can be switched smoothly.

In reversely rotating the output shaft 49 to back the automobile, the low-speed clutch 73 and the high-speed clutch 74 are disconnected, and the reverse clutch 75 is connected, whereupon the ring gear 63 is fixed. As this is done, the carrier 65 is rotated by means of the toroidal-type continuously variable transmission 47 and the first power transmission device 52. As the planet gear assemblies 64 rotate around their respective axes and move around the sun gear 51, moreover, the gear 51 and the output shaft 49 rotate in the direction opposite to the direction for the low- and high-speed drive modes.

Figure 3:
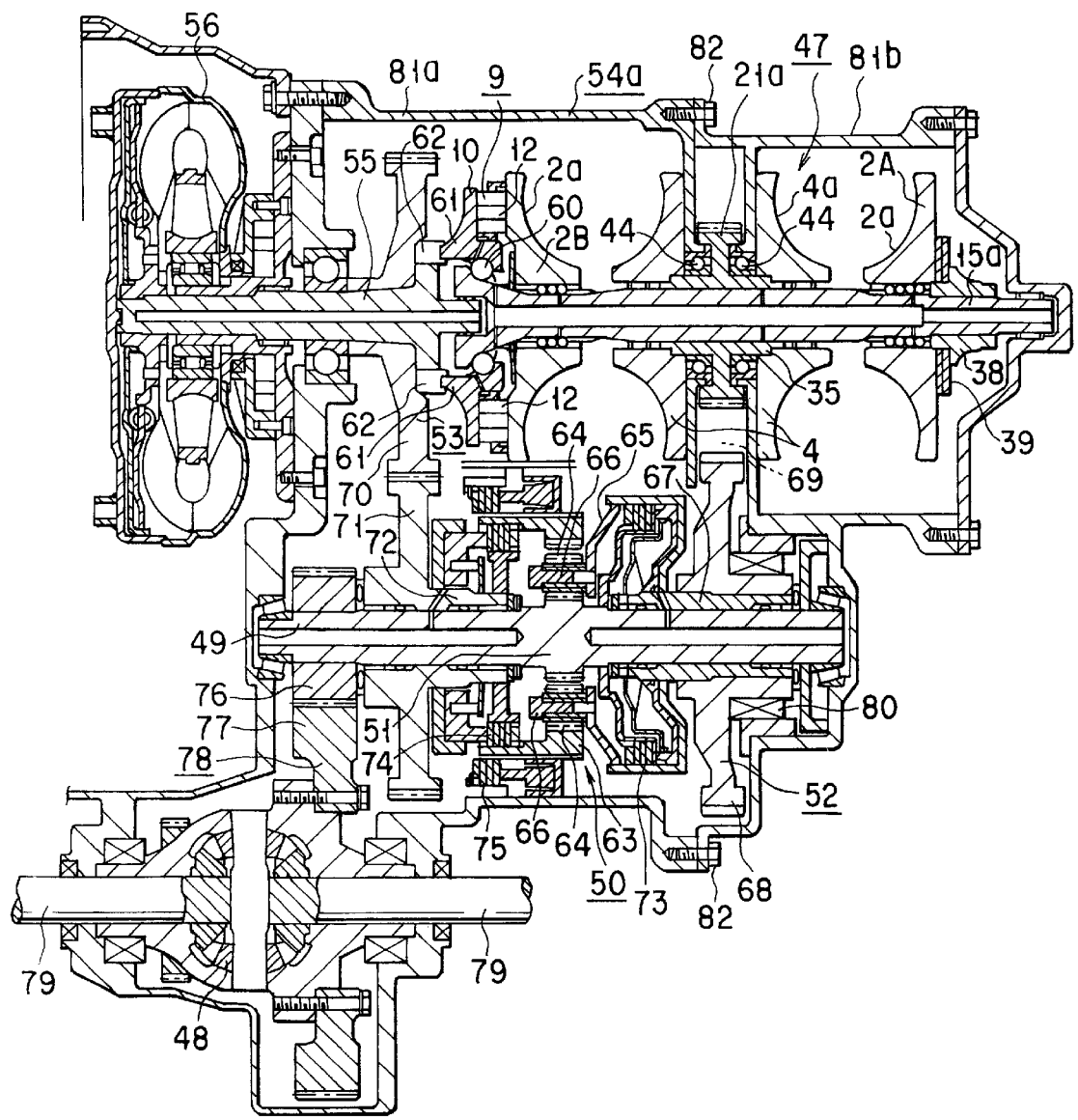
FIG. 3 is a sectional view of a continuously variable transmission unit according to a second embodiment of the invention.
Figure 4:
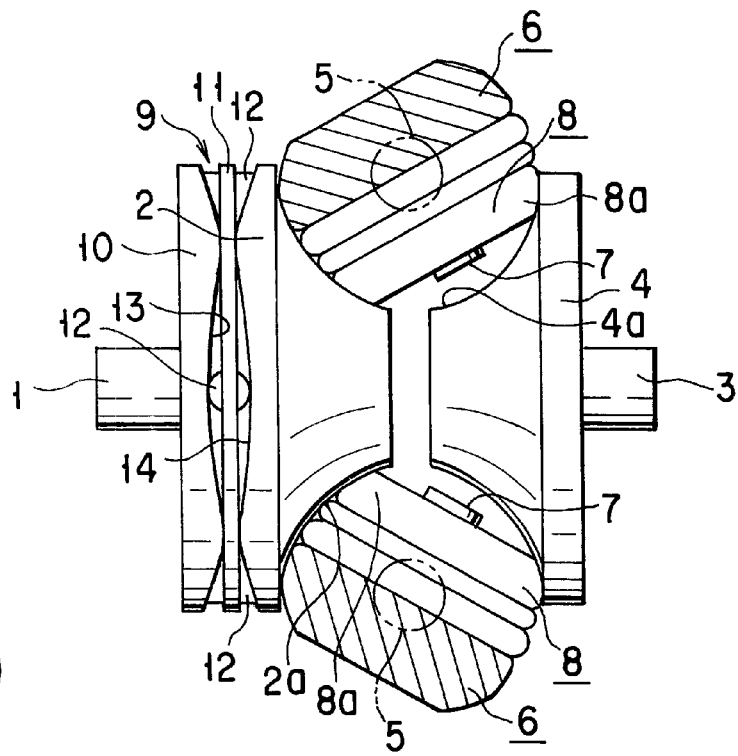
FIG. 4 is a partial side view of a toroidal-type continuously variable transmission in a deceleration state.
Figure 5:
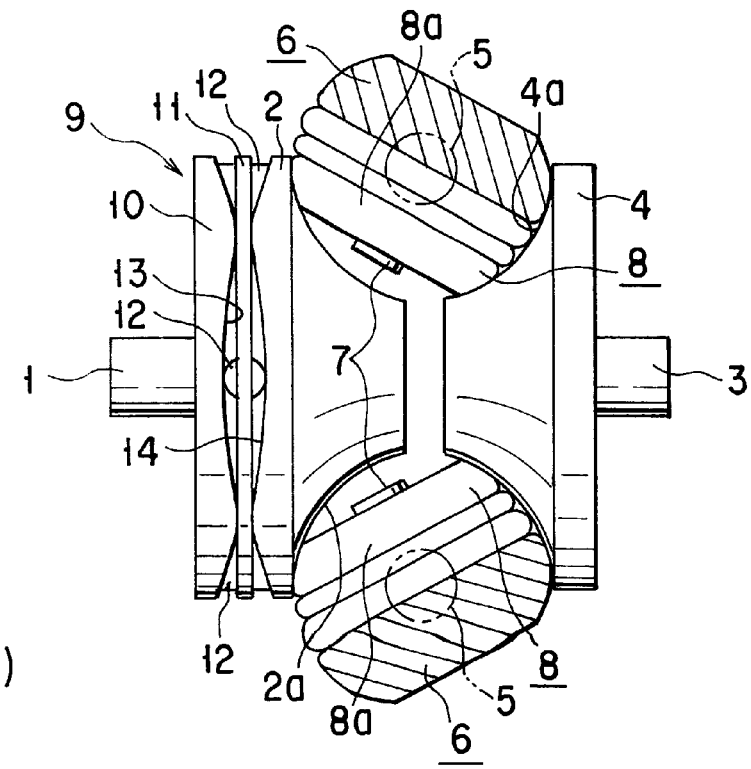
FIG. 5 is a partial side view of the toroidal-type continuously variable transmission of FIG. 4 in an acceleration state.
Figure 6:
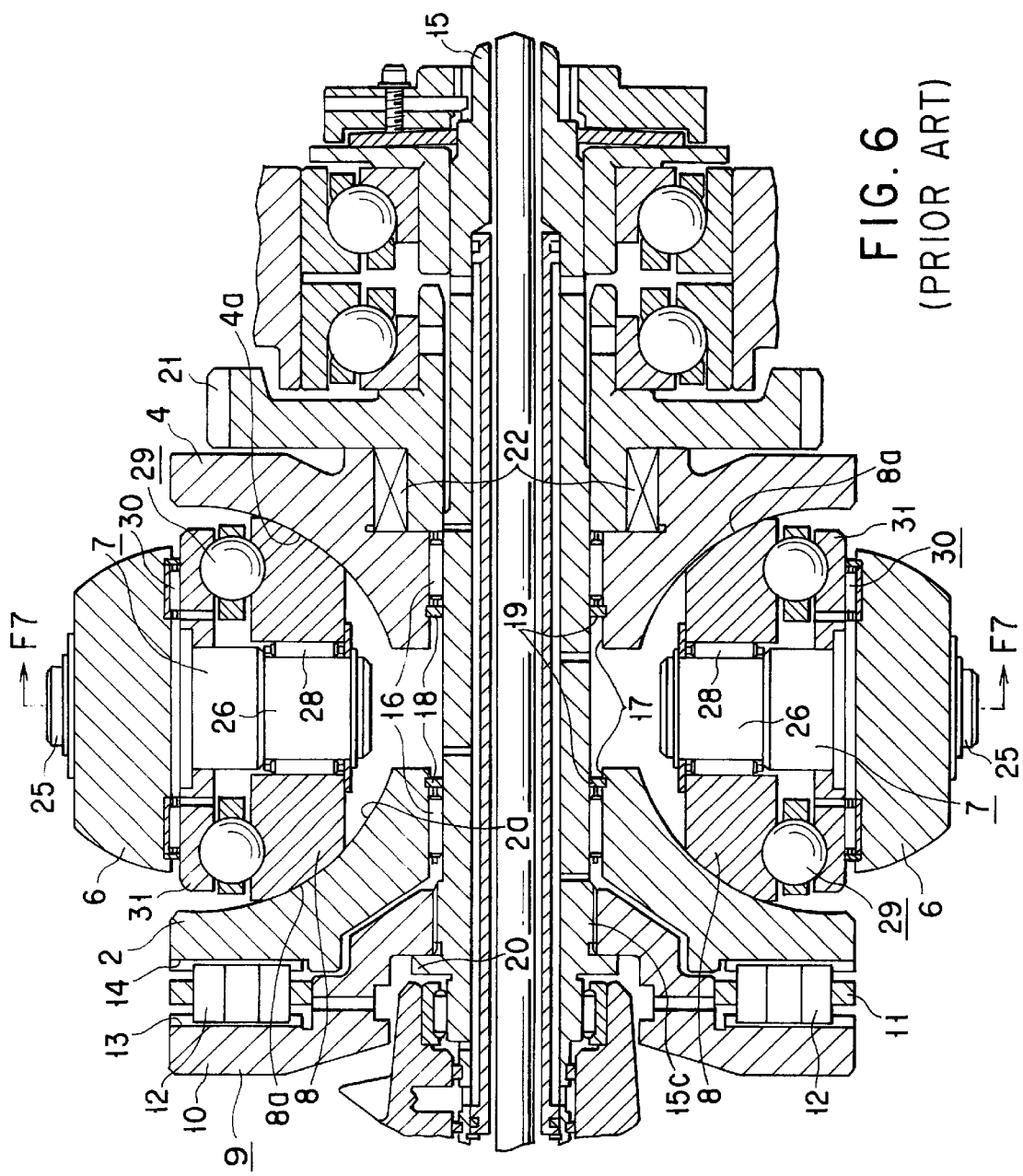
FIG. 6 is a sectional view of a conventional continuously variable transmission of the single-cavity type.
Figure 7:
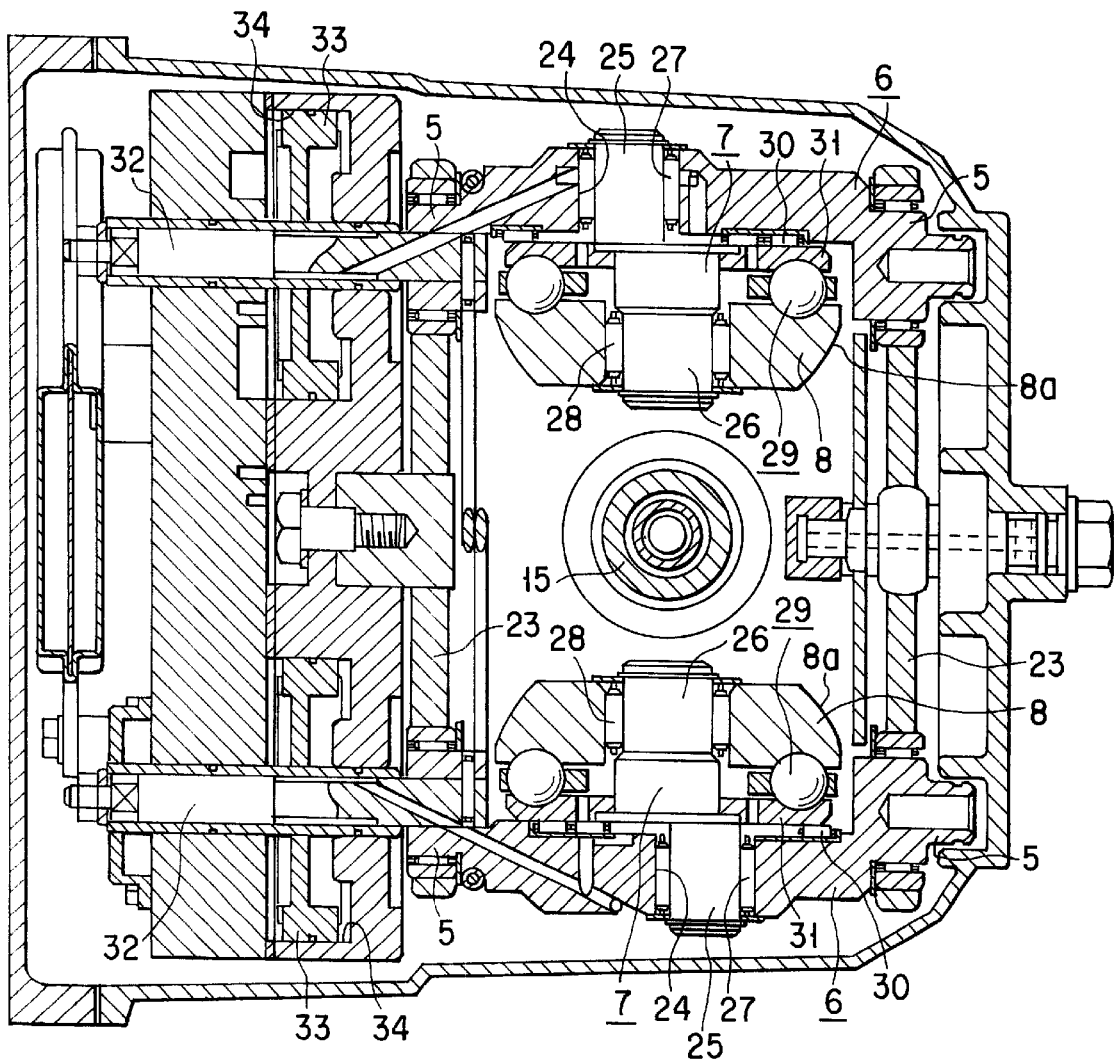
FIG. 7 is a sectional view of the continuously variable transmission taken along line F7—F7 of FIG. 6.

FIG. 3 shows a second embodiment of the present invention. A casing 54a of a continuously variable transmission unit according to this embodiment is composed of a pair of division units 81a and 81b. These units 81a and 81b are coupled to each other by means of bolts 82. A sleeve 35 that is attached to an output gear 21a is rotatably supported between the division units 81a and 81b, which are butted against each other, by means of a pair of rolling bearings such as ball bearings 44.

According to the second embodiment arranged in this manner, the supporting stiffness of the sleeve 35 can be made higher than in the case of the first embodiment (FIG. 1) where the sleeve 35 is supported in the casing 54 by means of the intermediate wall 43. In consequence, the displacement of the output gear 21a, which is fixed to the sleeve 35, can be lessened, so that the engagement between the gear 21a and the intermediate gear 69 (shown in FIG. 2) is satisfactory. Thus, the gears 21a and 69 are improved in durability, and noises that are produced between them can be reduced. According to this second embodiment, moreover, there is no necessity for laborious assembly operations, such as inserting the intermediate wall 43 deep into the casing 54 and fixing the wall 43 by means of bolts, which are required by the first embodiment. Thus, assembling the continuously variable transmission unit is easy. The second embodiment shares other arrangements, functions, and effects with the second embodiment. Therefore, common reference numerals are used to designate common portions throughout the drawings for simplicity of illustration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A continuously variable transmission unit comprising:
   an input shaft rotatable by means of a drive shaft;
   an output shaft located parallel to the input shaft and capable of fetching power based on the rotation of the input shaft;
   a toroidal continuously variable transmission of the double-cavity type including a pair of input discs arranged in parallel with each other with respect to the direction of power transmission and rotatable in concert with the input shaft, a pair of output discs opposed to the input discs, and power rollers located between the input discs and the output discs, the transmission being capable of synchronously changing the gear ratios between the input discs and the output discs by synchronously changing the respective angles of inclination of the power rollers;
   an epicyclic train including a sun gear coupled to the output shaft, a ring gear located around the sun gear, planet gears in mesh with the sun gear and the ring gear, and a carrier provided with a plurality of pivots individually supporting the planet gears for rotation;

a first power transmission device for transferring turning effort between the carrier and output discs;

a second power transmission device for transferring turning effort between the input shaft and the ring gear, the second power transmission device being designed so that $\beta/\alpha$ is substantially equal to a reduction ratio for the maximum acceleration of the continuously variable transmission, where $\beta$ and $\alpha$ are reduction ratios of the second and first power transmission devices, respectively;

a pressure device incorporated in the continuously variable transmission and located between the first and second power transmission devices with respect to the axial direction of the input shaft and the output shaft, the pressure device being designed to press the input discs and the output discs toward one another; and switching means capable of switching a drive mode to a high- or low-speed drive mode, depending on the state of transmission between the input shaft and the output shaft, wherein said switching means include a low-speed clutch capable of fixing the sun gear and the carrier to each other and a high-speed clutch located between the second power transmission device and the ring gear.

2. A continuously variable transmission unit according to claim 1, further comprising a reverse clutch capable of reversing the output shaft by stopping the rotation of the ring gear.

* * * * *

UNITED STATES PATENT AND TRADEMARK OFFICE
CERTIFICATE OF CORRECTION

PATENT NO.     : 6,251,038 B1
DATED          : June 26, 2001
INVENTOR(S)    : K. Ishikawa et al.

It is certified that error appears in the above-identified patent and that said Letters Patent is hereby corrected as shown below:

<u>Title page,</u>
Item [56], References Cited, FOREIGN PATENT DOCUMENTS,
insert in appropriate order the following:
-- FOREIGN PATENT DOCUMENTS
   1-234646   9/1989   (JP)
   7-158711   6/1995   (JP)
   8-21503    1/1996   (JP)
   8-35549    2/1996   (JP)
   10-103461  4/1998   (JP) --
Item [56], References Cited, FOREIGN PATENT DOCUMENTS,
insert in appropriate order the following:
-- 1-169169   7/1989   (JP)
   1-312266  12/1989   (JP) --

Signed and Sealed this

Twenty-third Day of July, 2002

*Attest:*

*Attesting Officer*

JAMES E. ROGAN
*Director of the United States Patent and Trademark Office*